Oct. 12, 1971  J. L. BENNETT ET AL  3,611,510
TWO-PIECE CORD FASTENER
Filed Oct. 7, 1969

INVENTORS
John L. Bennett &
BY James O. Partlow

Robert W. Smith
ATTORNEY 3,611,510
TWO-PIECE CORD FASTENER
John L. Bennett, Dayton, and James A. Partlow, Vandalia, Ohio, assignors to General Motors Corporation, Detroit, Mich.
Filed Oct. 7, 1969, Ser. No. 864,434
Int. Cl. F16g 11/00
U.S. Cl. 24—126                                          1 Claim

ABSTRACT OF THE DISCLOSURE

In a preferred form, a two-piece fastener for securing the end strands of a cord used to bind windings in a dynamoelectric machine includes a fastener body member having an integral and axially extending stem portion and a separate annular washer member. The stem portion includes a forward end which has a transverse slot formed therein for receiving the strands. The annular washer member is pressed over the forward end and onto the stem portion so as to clamp the strands between the annular washer member and the body member.

---

This invention relates to securing and clamping of strands of cord used in binding and lacing applications and more particularly to a two-piece fastener for clamping end strands of a lacing cord incorporated in windings of a dynamoelectric machine.

The use of binding or lacing cord in manufacturing processes usually includes the manually performed steps of tying and securing the end strands of a cord. Such steps are troublesome, time consuming and costly. An inexpensive cord fastener device is particularly desirable in the manufacture of dynamoelectric machines, for example, wherein lacing cords are used to bind the end turns of windings formed in stator and rotor core member. Wire conductors are wound through circumferentially spaced slots of a stator or rotor core member to form winding coils which have end turns overhanging the ends of the core member. Strands of lacing string or cord are interlaced through the winding end turns so that the winding conductors are bound together. After the end turns are laced through the winding end turns so that the winding tionally bound together in a knot. While the operation of lacing the cord around the winding end turns can be performed by automatic machine operations, there remains the manually performed function of tying the cord ends together.

In accordance with the present invention, a two-piece cord fastener made of a molded plastic material is provided including a body member having a head and a stem axially extending from the head. A forward end formed on the stem tapers inwardly from shoulder portion extending radially outwardly from the stem. The forward end is slotted to form resilient prongs and the slot formed therebetween receives the strands to be clamped. An annular washer is pressed over the shoulders at the forward end and tightly clamps the strands extending along the stem.

Accordingly, an object of this invention is to provide a two-piece fastener for quickly and securely clamping strands of cord wherein the strands are aligned in a slot on a fastener body member and clamped against a stem portion thereof by an annular washer member.

A further object of this invention is to provide a two-piece plastic fastener for securing strands of a cord interlacing winding end turns of a dynamoelectric machine in which the strands are aligned between resilient prongs formed on the end of a fastener body member and are clamped along opposite sides of a stem portion forming a recessed neck section wherein an annular washer member clamps the strands against the stem portion.

Further objects and advantages of this invention will become apparent from the following description, reference being had to the accompanying drawing wherein a preferred embodiment of the present invention is illustrated in which.

Figure 1:
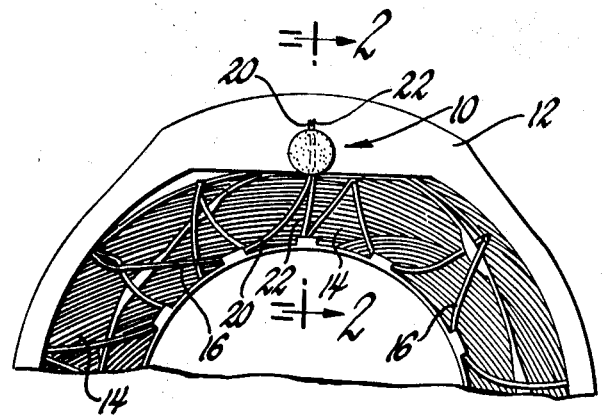
FIG. 1 is an end view of a dynamoelectric machine stator core incorporating the two-piece cord fastener of this invention.

Referring to FIG. 1, the two-piece cord fastener 10 of this invention is illustrated as it is incorporated on a stator core 12 of a dynamoelectric machine, for example, an electric motor. Winding end turns 14 formed by coils of wire conductors are disposed in circumferentially spaced slots provided in the core member 12. The end turns 14 extend beyond and overhang opposite ends of the stator core 12.

A lacing cord 16 formed of strands of an elongated flexible string or small cord lacing material is interlaced through the conductors of the winding end turns 14. End strands 20 and 22 of the lacing cord 16 are pulled so as to tighten the strands of the lacing cord 16 and bind the conductors of the winding end turns 14 together. Accordingly, the winding end turns 14 are bound in an integral and substantially rigid form. The two-piece cord fastener 10 clamps the end strands 20 and 22 of the lacing cord together to hold the cord 16 tightly laced about the winding end turns 14 in the manner described hereinbelow.

Figure 4:
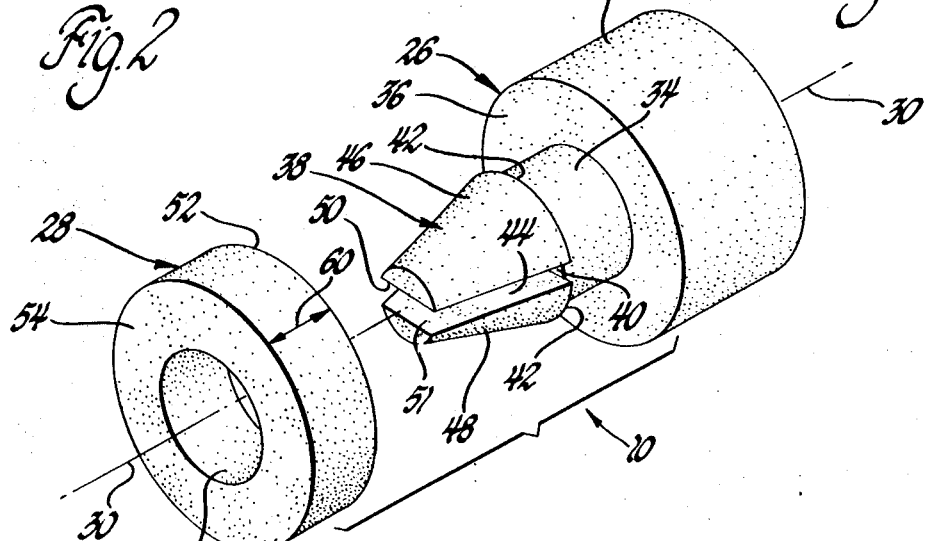
FIG. 4 is a perspective view of the two-piece cord fastener of this invention.

The two-piece fastener 10 is illustrated in the perspective view of FIG. 4. Two separate parts of the fastener include an integral body member 26 and an annular washer member 28 in which both members are preferably made of a molded nylon plastic material which has electrical insulating characteristics. The electrically insulating characteristics are desirable to prevent electrical contact with conductors of the winding end turns 14.

The body member 26 and annular washer member 28 are formed symmetrically about a longitudinal axis 30. The body member 26 includes a head 32 at the rearward end thereof and a stem 34 extending axially from a radial flange 36 formed on the head 32. The shape of the head 32 extending axially rearward from the flange 36 may have any suitable form, for example, a cylindrical shape as shown.

A forward end 38 of the body member 26 has a circular cross section and extends axially from a forward extremity 40 of the stem 34. The base of the forward end 38 provides a shoulder portion 42 extending radially from the forward stem extremity 40. A transverse slot 44 extending along the longitudinal axis 30 bisects the forward end 38 to form two identical resilient prongs 46 and 48. The slot 44 forms substantially parallel planar side walls 50 and 51 extending along the inner sides of the prongs 46 and 48, respectively. The side walls 50 and 51 extend axially to the forward stem extremity 40 forming a bottom surface of the slot 44. The outer surfaces of the prongs 46 and 48 are tapered and converging from the shoulder portion 42 so that each provides a partial frusto-conical surface capable of being deflected radially inward.

The stem 34 includees a circular cross section providing a cylindrical side surface extending from a rearward extremity at the radial flange 36 to the forward stem extremity 40 at the shoulder portion 42. The shoulder portion 42 faces and is substantially parallel to the flange 36 so that the stem 34 forms a recessed neck for receiving and supporting the annular washer member 28.

The annular washer member 28 has a circular ring shape including substantially flat sides 52 and 54. A circular bore 58 extending axially through the center of the annular washer member 28 has a diameter substantially the same as the diameter of the circular cross section of the stem 34. Accordingly, the bore 58 is complementary to the stem cylindrical surface. The thickness 60 between the flat sides 52 and 54 is slightly less than the axial distance between the flange 36 and the shoulder portion 42.

Figure 2:
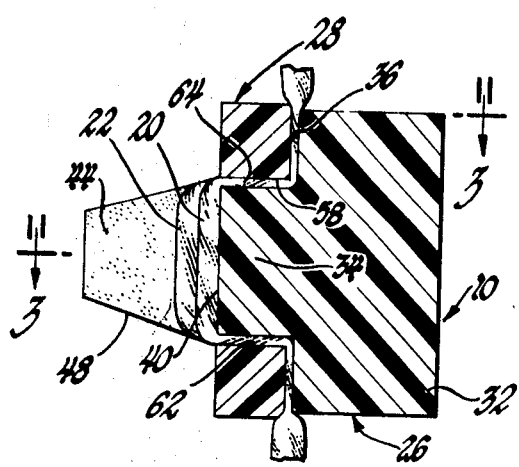
FIG. 2 is a section view taken along lines 2—2 of FIG. 1 and looking in the direction of the arrows.
Figure 3:
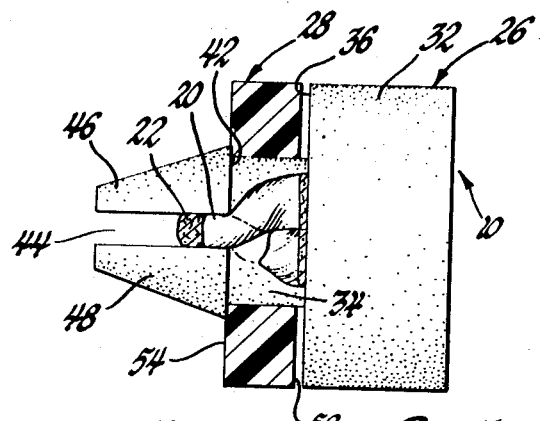
FIG. 3 is a sectional view taken along lines 3—3 of FIG. 2 and looking in the direction of the arrows.

The figures 2 and 3 illustrate sectional views of the two-piece fastener 10 of this invention assembled and clamping the strands 20 and 22 of the lacing cord 16. The strands 20 and 22 extend through the slot 44 in generally aligned and overlapping relationship and rest against the slot bottom on the forward stem extremity 40. Each strand includes two axial portions 62 and 64 extending along opposite sides of the stem 34 so that they form a substantially U-shaped loop. The annular washer member 28 is mounted over strand portions 62 and 64 so that the bore 58 compresses the strands against the stem 34 to clamp them to the body member 26. Preferably, the bore 58 fits as tightly as possible to permit insertion of the strands 20 and 22 and stem 34 into the washer member 28. Accordingly, the largest diameter of the bore 58 is to be less than the combined diameter of the stem 34 and thickness of the clamped strands of cord.

The sides 52 and 54 of the annular washer member 28 are adjacent the flange 36 and shoulder portion 42, respectively, so that the washer member is locked in place axially and prevented from being removed from the body member 26. The shoulder portion 42 extends radially outward a sufficient distance for axially locking the annular washer member 28 and also to permit axial insertion through the bore 58 by inward deflection of the prongs 46 and 48. The strands 20 and 22 are loosely clamped in the space between the end 52 of the annular washer member 28 and the flange 36 wherein the ends of the strand portions 62 and 64 extend radially outward from the body member 26.

To assemble the two-piece cord fastener 10 of this invention to the strands 20 and 22, the strands to be clamped are inserted into the slot 44 to thereby hold the strands aligned and in place prior to mounting of the annular washer member 28. The strands are looped rearward toward the head 32 to form the strand portions 62 and 64 extending axially along opposite sides of the stem 34. The prongs 46 and 48 are initially inserted into the bore 58 of the annular washer member 28. The prongs 46 and 48 are resiliently deflected inwardly as the washer member 28 slides over the tapered surfaces of the prongs 46 and 48 to facilitate pressing of the annular washer member 28 over the shoulder portion 42. When the washer member side 54 passes over the shoulder portion 42, the prongs spring or snap back to their normal position and the washer member is then mounted on the stem 34 and over the strand portions 62 and 64.

The strands 20 and 22 are compressed against the stem 34 and are clamped to the body member 26 by being crimped in U-shaped loops. The strand loops enter and exit the two-piece fastener 10 along radially outwardly extending strand portions extending between the washer side 52 and the flange 26. The strand portions 62 and 64 are bent at right angles to the entering and exiting strand portions to extend axially along opposite sides of the stem 34. To complete each loop, the strands are bent radially inwardly at right angles to the strand portions 62 and 64 as they lay against the forward stem extremity 40. Thus, the strands 20 and 22 are crimped at opposite corners which are formed at the junction of the sides of the stem 34 and forward stem extremity 40. Also, the strands 20 and 22 are clamped between opposite corner portions formed radially at the junction of the washer bore 58 and the washer side 52. The strands are permanently clamped since the annular washer member 28 is axially locked in place between the flange 26 and shoulder portion 42.

Accordingly, it can be seen that strands of a cord are securely clamped by means of the simple two-piece cord fastener 10 of this invention which is capable of being mass produced of inexpensive plastic material.

While the embodiment of the two-piece cord fastener described hereinabove constitutes a preferred embodiment it is to be understood that other forms may be adopted in accordance with the present invention.

What is claimed is as follows:

1. A two-piece fastener for clamping plural strands of lacing cord which bind winding end turns of a dynamoelectric machine, comprising: a body member formed symmetrically about a longitudinal axis extending between opposite ends thereof, one of said opposite ends of said body member including a head having an inner side defining a radial flange; a cylindrical stem extending from the center of said inner side such that said radial flange extends outwardly adjacent a first axial extremity of said stem; the other of said opposite ends of said body member including a pair of spaced resilient prongs having base parts extending radially outward from a second axial extremity of said stem so as to define shoulder portions facing said radial flange, said pair of resilient prongs having conical outer surfaces converging from said base parts and a pair of facing inner side walls defining a slot extending axially to said second extremity of said stem such that said plural strands of lacing cord are initially positioned along the bottom of said slot and against said second axial extremity of said stem; and an annular washer member having a pair of flat sides and a circular bore, said pair of flat sides spaced apart by a thickness slightly less than the distance between said first and second axial extremities of said stem, said washer member further having a circular bore having a diameter substantially equal to the diameter of said stem such that said pair of resilient prongs are urged toward each other upon initial insertion of said body member through said circular bore of said washer member and further insertion enables an inner side of said pair of flat sides of said washer member that faces said radial flange to bend said plural strands of lacing cord axially along said stem and into a loop configuration with the insertion of said body member being terminated by positioning said washer member past said base parts so that said pair of flat sides of said washer member are locked between said shoulder portions and said radial flange, and said washer member being effective when in said locked position to clamp said strands over one pair of opposite corners formed on said second axial extremity of said stem and a second pair of corners formed between said circular bore and said inner side of said washer member, and being further effective to compressively clamp axial strand portions of said lacing cord between said stem and said washer and radial strand portion of said lacing cord exiting and entering said fastener between said inner side of said washer member and said radial flange thereby fixedly locking said washer member and said body member together and fixedly clamping said plural strands of lacing cord therebetween.

References Cited

UNITED STATES PATENTS

| | | | |
|---|---|---|---|
| 858,555 | 7/1907 | Altick | 24—129 B |
| 2,214,961 | 9/1940 | Hawley | 24—126 X |
| 3,140,520 | 7/1964 | Marino et al. | 24—126 |

FOREIGN PATENTS

| | | | |
|---|---|---|---|
| 1,111,742 | 3/1956 | France | 24—73.8 P |

PAUL R. GILLIAM, Primary Examiner